United States Patent
Weisman, II

(10) Patent No.: US 6,411,888 B1
(45) Date of Patent: Jun. 25, 2002

(54) GAUGING DRIVING EFFICIENCY

(75) Inventor: S. Miller Weisman, II, Farmington Hills, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/592,153

(22) Filed: Jun. 12, 2000

(51) Int. Cl.⁷ ............................ G06F 19/00; B60T 7/18
(52) U.S. Cl. .................. 701/115; 73/117.3; 701/110; 701/70; 340/439
(58) Field of Search ................. 701/101, 102, 701/103, 104, 105, 110, 111, 115, 207, 213, 215, 70; 73/117.3, 116; 340/438, 439, 459, 461, 462

(56) References Cited

U.S. PATENT DOCUMENTS

| | | |
|---|---|---|
| 4,385,604 A | 5/1983 | Fiala |
| 4,747,301 A * | 5/1988 | Bellanger .................. 73/117.3 |
| 4,885,690 A | 12/1989 | Schimmel et al. |
| 5,200,900 A | 4/1993 | Adrain et al. |
| 5,446,665 A * | 8/1995 | Adrian et al. ................ 701/115 |
| 5,477,827 A | 12/1995 | Weisman II et al. |
| 5,619,412 A | 4/1997 | Hapka |
| 5,732,676 A | 3/1998 | Weisman et al. |
| 5,769,051 A * | 6/1998 | Bayron et al. ............... 701/115 |
| 5,857,158 A * | 1/1999 | Zimmermann et al. ...... 701/115 |
| 5,983,156 A | 11/1999 | Andrews |
| 6,026,784 A | 2/2000 | Weisman et al. |
| 6,112,151 A * | 8/2000 | Kruse ......................... 701/115 |
| 6,151,549 A | 11/2000 | Andrews et al. |
| 6,170,463 B1 * | 1/2001 | Koerner ....................... 701/115 |

* cited by examiner

Primary Examiner—Willis R. Wolfe
(74) Attorney, Agent, or Firm—Brooks & Kushman P.C.

(57) ABSTRACT

An efficiency gauge may be used for controlling an automotive vehicle. At least one vehicle parameter is sampled during vehicle operation and at least one measure of driving efficiency is determined from the sampled vehicle parameters. Efficiency measurement may include determining an estimate of kinetic energy lost. One such estimate is the sampled braking velocity cost found based on the difference of the squares of the last two vehicle velocities if the vehicle has decelerated and braking has occurred.

45 Claims, 2 Drawing Sheets

GAUGING DRIVING EFFICIENCY

TECHNICAL FIELD

This invention relates to engine and vehicle control through feedback of driving performance.

BACKGROUND ART

Automotive vehicles are ultimately controlled by a human operator that makes decisions about the vehicle including speed, direction, and operating parameters such as transmission gear, accessory operation, refueling, maintenance, and the like. While many operators develop a general feel for how a vehicle is performing, the vehicle generally provides little if any quantitative information to the driver indicating how efficiently the vehicle is operating.

An example of the need for vehicle efficiency feedback occurs with on-highway heavy trucks. Vehicle operators have direct or indirect control over a wide range of vehicle parameters including engine fuel, service (wheel) brakes, engine retarders such as engine brakes and Jake brakes, transmission retarders, transmission gear, idling time, use of engine driven accessories such as air conditioning, and the like. Each of these parameters affects the efficiency of operation and, hence, the cost of operation. Truck owner/operators and fleet owners are highly concerned with operational costs and are therefore in need of quantitative measures of vehicle operating efficiency.

One problem with previous measures of vehicle operating efficiency is a failure to provide meaningful cost-related information relevant to vehicle control. Measures, such as instantaneous miles per gallon of fuel consumed (MPG), tend to relay inaccurate cost indicators to a vehicle driver or automatic controller. For example, MPG decreases during vehicle acceleration and increases during vehicle braking. This often does not reflect optimum driving requirements. Acceleration adds energy to the vehicle and braking removes energy from the vehicle. Braking, in particular, should be avoided if possible to prevent loss of vehicle energy through heat.

DISCLOSURE OF INVENTION

It is an object of the present invention to provide quantitative measures of vehicle operating efficiency. These measures may be used for a variety of purposes including display to the vehicle operator, storage in memory for future analysis, and input to engine controllers.

In carrying out the objects and features of the present invention, a method is provided for controlling an automotive vehicle. At least one vehicle parameter is sampled. At least one measure of driving efficiency is determined based on the sampled vehicle parameter. An estimate of operating cost is found based on the at least one measure of driving efficiency.

In an embodiment of the present invention, at least one driving efficiency limit is set. An increase in the maximum allowed vehicle velocity is permitted if the measure of driving efficiency exceeds the driving efficiency limit.

In embodiments of the present invention, measures of driving efficiency may include measures of normalized cost, measures of shifting and idling cost, and measures of change in vehicle kinetic energy such as, for example, may be caused by vehicle braking.

A method for gauging vehicle efficiency is also provided by the present invention. Vehicle velocity is repetitively sampled. If the sampled vehicle velocity is less than a previously sampled vehicle velocity and if braking is applied, the sampled braking velocity cost is determined based on the difference between the square of the sampled vehicle velocity and the square of the previously sampled vehicle velocity. A measure of driving efficiency is then determined based on the sampled braking velocity cost. These measures may include instantaneous braking velocity cost per mile and average braking velocity cost per mile.

In another method for gauging driving efficiency provided by the present invention, an engine revolution idle cost is determined. The engine speed is repetitively sampled. At least one sampled shifting and idling cost is determined as the product of a sampled engine speed and the engine revolution idle cost. A measure of driving efficiency is found based on the sampled shifting and idling cost. These measures may include instantaneous shifting and idling cost per mile and average shifting and idling cost per mile.

A driving efficiency gauge is also provided. A display presents at least one measure of driving efficiency to the vehicle operator. A memory holds a sequence of at least one measure of driving efficiency. Control logic in communication with the electronic control module controlling an internal combustion engine receives samples of at least one vehicle operating parameter from the electronic control module. The sequence of driving efficiency measures is determined based on the vehicle operating parameter samples. At least one of the efficiency measures is displayed and the sequence of efficiency measures is stored in the memory.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
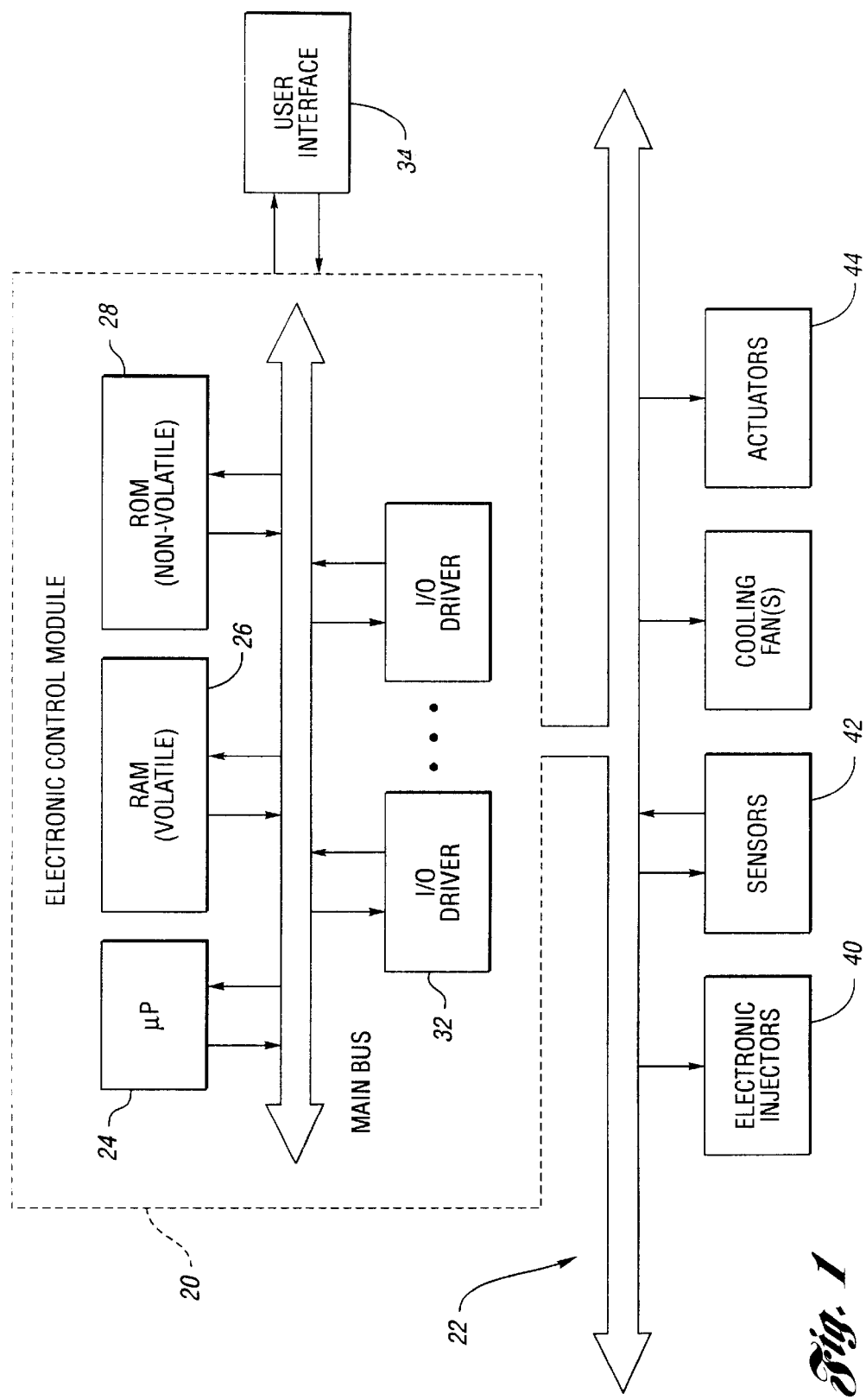
FIG. 1 is a block diagram illustrating an integrated control system for an internal combustion engine according to an embodiment of the present invention.

Referring to FIG. 1, a block diagram illustrating an integrated control system for an internal combustion engine according to an embodiment of the present invention is shown. Electronic control module (ECM) 20 is in communication with typical engine components, shown generally by reference 22, and user interface 34. As shown, ECM 20 includes microprocessor 24 having volatile random access memory (RAM) 26, and nonvolatile read only memory (ROM) 28. ECM 20 may contain other types of memory instead of, or in addition to, RAM 26 and ROM 28, such as EPROM, EEPROM, flash memories, and the like, as is well known in the art.

ROM 28, or other nonvolatile memory, may contain instructions which are executed to perform various control and information functions. ROM 28 may also contain data tables which include calibration values and parameters characterizing normal engine operation. Microprocessor 24 imparts control signals to, and receives signals from, input and output (I/O) drivers 32. I/O drivers 32 are in communication with engine components 22 and serve to protect controller 20 from hostile electrical impulses while providing the signals and power necessary for engine control according to the present invention. ECM components 22 are interconnected by data, address and control buses. It should be noted that there are a variety of other possible control schemes which include various combinations of microprocessors and electric or electronic circuits which could perform the same function.

With continuing reference to FIG. 1, engine components 22 include a plurality of electronic unit injectors (EUI) 40, each associated with a particular engine cylinder, and a plurality of sensors 42 for indicating various vehicle operating conditions such as vehicle speed, engine speed, engine retardation, transmission retardation, vehicle braking, coolant temperature, ambient air temperature, intake manifold air temperature, inlet air temperature, engine oil temperature, fuel temperature, intercooler temperature, throttle position, intake manifold pressure, fuel pressure, oil pressure, coolant pressure, cylinder position, and cylinder sequencing, to name a few. Engine components 22 also includes actuators 44 which may include solenoids, variable valves, indicator lights, motors, and/or generators. It should be appreciated that ECM 20 may also be in communication with other vehicle components and microprocessors which control associated vehicle systems, such as the brakes, the transmission, a vehicle management system or a fleet management radio transponder.

The user interface, or data-hub, 34 is used to store user-selected monitoring parameters and associated values for those parameters, to display selected parameters, to determine service intervals, and to perform trend analyses. User selected parameters may include adjustable limits, such as desired engine oil life. Engine historical information may include diagnostic information which is used to assist personnel performing routine maintenance, or troubleshooting malfunctions, as well as engine and vehicle operation data, which may be analyzed to evaluate vehicle operator performance in addition to vehicle performance. User interface 34 also performs component lifing and trend analyses. It should be appreciated that, although FIG. 1 illustrates user interface 34 as being external to ECM 20, certain operations describe as being performed by user interface 34 could, of course, also be performed by the ECM 20. Similarly, some of the operations described as being performed by ECM 20 may be performed by user interface 34. In fact, one of ordinary skill in the art will recognize that ECM 20 and user interface 34 may also be implemented as a single unit.

In an embodiment of the present invention, user interface 34 is used to set at least one driving efficiency limit and a vehicle velocity or speed limit. At least one vehicle performance parameter is sampled and a measure of driving efficiency determined based on the sampled parameters. If the measure of driving efficiency exceeds the driving efficiency limit, the driver is permitted to exceed the vehicle velocity limit. Since drive time is critical to most drivers, this provides fleet operators with the ability to reward employee drivers for efficient driving.

Driving efficiency measures indicate a vehicle operator's ability to conserve vehicle energy and to reduce operating costs. One measure of driving efficiency is kinetic energy loss and, in particular, vehicle energy converted to heat through braking. If a driver pulls away from a first traffic light, accelerates heavily, then has to stop at the next traffic light, more energy is wasted than if the driver pulls away from the first traffic light, accelerates to a lower peak speed, then continues rolling at the next traffic light. Similarly, a driver that can reduce speed by coasting over a great distance will expend less energy than a driver that maintains velocity until the last moment before applying hard braking.

Another measure of driving efficiency is normalized cost. In basic forms, this may be expressed as the cost of operating a vehicle per unit distance traveled or per unit of time. More specific costs may also be used. For example, a measure of shifting and idling cost may be found as the product of engine speed and engine revolution idle cost or the cost per revolution of running the engine at idle. The engine revolution idle cost may be found experimentally or may be estimated from design information, and may be modified based on engine options, engine life, vehicle operating conditions, and the like.

Figure 2:
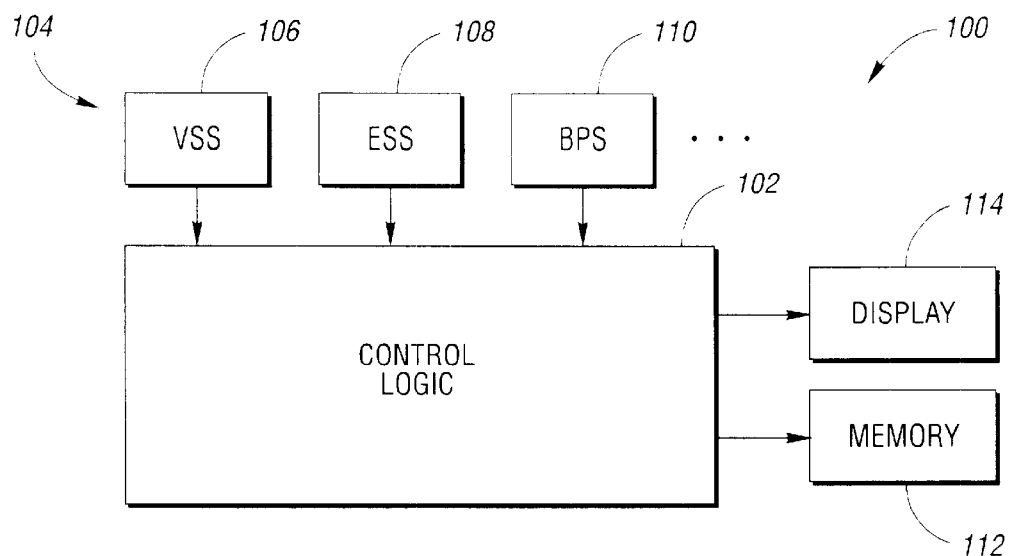
FIG. 2 is a block diagram illustrating an efficiency gauge according to an embodiment of the present invention.

Referring now to FIG. 2, a block diagram illustrating an efficiency gauge according to an embodiment of the present invention is shown. An efficiency gauge, shown generally by 100, includes control logic 102. Control logic 102 may reside in either or both of ECM 20 or user interface 34. Control logic 102 accepts inputs from a plurality of sensors, shown generally by 104, including vehicle speed sensor (VSS) 106 measuring vehicle velocity, engine speed sensor (ESS) 108 measuring engine rotational speed, brake pedal switch (BPS) 110 detecting the application of brakes by the vehicle operator, an indication of engine braking or retardation, and the like. Through sensors 104, control logic 102 samples at least one vehicle operating parameter. Control logic 102 determines a sequence of at least one measure of driving efficiency based on the sampled vehicle operating parameters. At least a portion of the sequence of driving efficiency measurements are stored in memory 112 for use in efficiency calculations or for later recovery and examination. At least one efficiency measure is provided to display 114 for viewing by the vehicle operator. This provides the operator with feedback, thereby fostering improved driving efficiency.

In an embodiment of the present invention, control logic 102 calculates at least one shifting and idling cost index. An estimate of the cost per engine revolution while non-moving or idle, $C_I$, is provided to control logic 102. The product of $C_I$, and the engine speed, $\omega_i$, is the sampled idle cost for the $i^{th}$ sample of engine speed, indicating the cost of running the engine. One measure of efficiency is then the average shifting and idling cost per unit distance, ASIC, as expressed in Equation 1:

$$ASIC = \frac{\sum_{i \in n} C_I \times \omega_i}{\sum_{i \in n} d_i} \tag{1}$$

Where $d_i$ is the distance traveled during the $i^{th}$ sample and n is a set of samples.

Another measure of efficiency is the instantaneous shifting and idling cost per mile, $ISIC_i$, which is expressed in Equation 2:

$$ISIC_i = K_{ISIC} \frac{C_I \times \omega_i}{v} \tag{2}$$

Where v is a measure of vehicle velocity, such as the average speed over the sampling period, and $K_{ISIC}$ is a correction factor based on the units chosen to measure engine speed and vehicle velocity.

Figure 3:
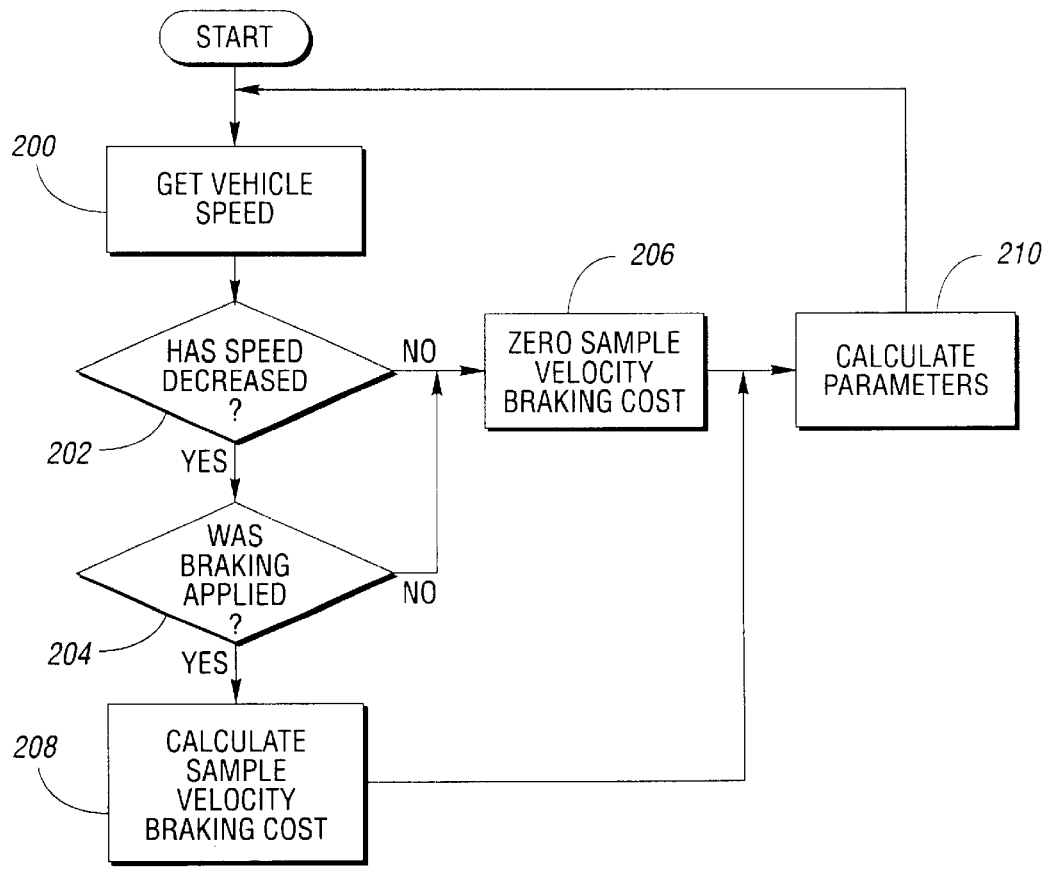
FIG. 3 is a flow chart illustrating a method for gauging vehicle efficiency according to an embodiment of the present invention.

Referring now to FIG. 3, a flow chart illustrating a method for gauging vehicle efficiency according to an embodiment of the present invention is shown. As will be appreciated by one of ordinary skill in the art, the operations illustrated are not necessarily sequential operations. Similarly, operations may be performed by software, hardware, or a combination of both. The present invention transcends any particular implementation and is shown in a sequential flow chart form for ease of illustration.

A measure of driving efficiency may be calculated based on kinetic energy lost due to braking. A sample of vehicle speed is obtained in block 200. Vehicle speed samples may be prefiltered, either using analog components or through a digital filter implemented in control logic 102, to reduce the effects of sensor noise, line noise, and other disturbances. For example, a first order low pass filter with a two second time constant is used.

A check to determine if vehicle speed has decreased is made in block 202. The current sample of vehicle speed is compared to the previous vehicle speed sample of vehicle speed. If the vehicle has slowed, a check to determine if braking was applied is made in block 204. Braking may be through a variety of means, including wheel brakes, engine retarders, transmission retarders, and the like. Braking may be detected from a brake pedal switch, may be determined from a command by a controller to apply a braking means, may be detected by a braking sensor, or any other suitable method.

If either vehicle speed has not decreased or braking has not occurred, the current sample velocity braking cost, $SVBC_i$, is set to zero in block 206. This indicates that the operator is not attempting to either directly or indirectly slow the vehicle through braking. If both vehicle speed has decreased and braking has occurred, the current sample velocity braking cost is calculated by Equation 3:

$$SVBC_i = K_{SVBC} \times [v_i^2 - v_{i-1}^2] \quad (3)$$

Where $K_{SVBC}$ is a constant based on fuel cost, vehicle weight, and powertrain efficiency. For example, let $C_{fuel}$ be the normalized cost of fuel at $1 per gallon. An 80,000 pound (GWV) vehicle requires 5 hp-hr stored energy ($E_{stored}$) at 60 miles per hour. The specific fuel consumption for overall moving efficiency for this vehicle, $N_{fuel}$ is 0.06 gallons per hp-hr. An approximation for $K_{SVBC}$ is provided by Equation 4:

$$K_{SVBC} = \frac{C_{fuel} \times E_{stored} \times N_{fuel}}{60^2} = 8.3 \times 10^{-5} \quad (4)$$

Output and computational parameters are calculated in block 210. For example, the current sample of vehicle velocity is set to the previous sample of vehicle velocity. Also, any desired measures of driving efficiency may be calculated. One such measure is the instantaneous braking velocity cost per unit distance, $IBVC_i$, as expressed in Equation 5:

$$IBVC_i = \frac{SBVC_i}{d_i} \quad (5)$$

Another measure is the average braking velocity cost per unit distance, ABVC, as expressed in Equation 6:

$$ABVC = \frac{\sum_{i \in n} SBVC_i}{\sum_{i \in n} d_i} \quad (6)$$

Once calculated, the instantaneous braking velocity cost per unit distance, the average braking velocity cost per unit distance, or a similar measure of driving efficiency may be written into memory 112, indicated on display 114, or both.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling an automotive vehicle comprising:
    sampling at least one vehicle parameter;
    determining at least one measure of driving efficiency based on the at least one sampled vehicle parameter; and
    determining an estimate of operating cost based on the at least one measure of driving efficiency.

2. A method of controlling an automotive vehicle as in claim 1 further comprising:
    setting at least one driving efficiency limit; and
    permitting an increase in maximum allowed vehicle velocity if the at least one measure of driving efficiency exceeds the at least one driving efficiency limit.

3. A method of controlling an automotive vehicle as in claim 1 wherein driving efficiency comprises a measure of normalized cost.

4. A method of controlling an automotive vehicle as in claim 1 further comprising displaying at least one measure of driving efficiency to an operator of the vehicle.

5. A method of controlling an automotive vehicle as in claim 1 further comprising storing a sequence of at least one measure of driving efficiency in memory for later retrieval.

6. A method of controlling an automotive vehicle as in claim 1 wherein driving efficiency comprises a measure of shifting and idling cost.

7. A method of controlling an automotive vehicle as in claim 6 wherein determining at least one measure of driving efficiency comprises:
    determining a sampled idle cost as a product of sampled engine speed and an engine revolution idle cost; and
    determining an instantaneous shifting and idling cost per unit distance as a ratio of the sampled idle cost to a measure of vehicle velocity.

8. A method of controlling an automotive vehicle as in claim 6 wherein determining at least one measure of driving efficiency comprises:
    determining a sampled idle cost as a product of sampled engine speed and an engine revolution idle cost; and
    determining an average shifting and idling cost per unit distance as a ratio of a sum of sampled idle costs for a number of samples to an amount of distance traveled during the number of samples.

9. A method of controlling an automotive vehicle as in claim 1 wherein driving efficiency comprises a measure of change in vehicle kinetic energy.

10. A method of controlling an automotive vehicle as in claim 9 wherein the measure of change in vehicle kinetic energy comprises a measure of braking velocity cost.

11. A method of controlling an automotive vehicle as in claim 10 wherein the measure of the braking velocity cost comprises a sampled braking velocity cost proportional to a difference between a square of a current sampled vehicle velocity and a square of a previous sampled vehicle velocity if the vehicle has decelerated between the previous sampled vehicle velocity and the current sampled vehicle velocity and if braking has been applied.

12. A method of controlling an automotive vehicle as in claim 11 wherein braking is applied if at least one from a set including asserting a vehicle brake, applying an engine brake, and applying an engine retarder occurs.

13. A method of controlling an automotive vehicle as in claim 11 wherein determining at least one measure of driving efficiency comprises determining an instantaneous braking velocity cost per mile as the ratio of the sampled braking velocity cost to a measure of distance traveled between acquiring the previous sampled vehicle velocity and the current sampled vehicle velocity.

14. A method of controlling an automotive vehicle as in claim 11 wherein determining at least one measure of driving efficiency comprises determining an average braking velocity cost per mile as the ratio of the sum of sampled braking velocity costs for a number of samples to an amount of distance traveled during the number of samples.

15. A method of gauging driving efficiency for an automotive vehicle comprising:
repetitively sampling vehicle velocity;
for at least one vehicle velocity sample, determining if the sampled vehicle velocity is less than a previously sampled vehicle velocity and determining if braking is applied;
if the sampled vehicle velocity is less than the previously sampled vehicle velocity and if braking is applied, determining the sampled braking velocity cost based on the difference between the square of the sampled vehicle velocity and the square of the previously sampled vehicle velocity; and
determining a measure of driving efficiency based on the determined sampled braking velocity cost.

16. A method of gauging driving efficiency as in claim 15 wherein determining driving efficiency comprises determining an instantaneous braking velocity cost as the ratio of the sampled braking velocity cost to a measure of distance traveled between the sampled vehicle velocity and the previously sampled vehicle velocity.

17. A method of gauging driving efficiency as in claim 15 wherein determining driving efficiency comprises determining an average braking velocity cost as a ratio of a sum of a plurality of sampled braking velocity costs to a measure of distance covered during the samples in the plurality of sampled braking velocity costs.

18. A method of gauging driving efficiency as in claim 15 further comprising displaying a measure of driving efficiency for an operator of the vehicle.

19. A method of gauging driving efficiency as in claim 15 further comprising storing at least one measure of driving efficiency in memory.

20. A method of gauging driving efficiency for an automotive vehicle comprising:
determining an engine revolutions idle cost;
repetitively sampling engine speed;
determining at least one sampled shifting and idling cost as the product of a sampled engine speed and the engine revolution idle cost; and
determining a measure of driving efficiency based on the determined sampled shifting and idling cost.

21. A method of gauging driving efficiency as in claim 20 wherein the measure of driving efficiency comprises determining an instantaneous shifting and idling cost per mile based on the ratio of the sampled shifting and idling cost to a measure of the vehicle velocity.

22. A method of gauging driving efficiency as in claim 20 wherein the measure of driving efficiency comprises determining an average shifting and idling cost per mile based on the ratio of the sum of a plurality of sampled shifting and idling costs to the amount of distance traveled over the period of the plurality of sampled shifting and idling costs.

23. A method of gauging driving efficiency as in claim 20 further comprising displaying a measure of driving efficiency for an operator of the vehicle.

24. A method of gauging driving efficiency as in claim 20 further comprising storing at least one measure of driving efficiency in memory.

25. A driving efficiency gauge in communication with an engine control module for controlling an internal combustion engine in an automotive vehicle, the driving efficiency gauge comprising:
a display for displaying at least one measure of driving efficiency;
a memory for holding a sequence of at least one measure of driving efficiency; and
control logic in communication with the electronic control module, the display, and the memory, the control logic operative to
(a) receive a plurality of samples of at least one vehicle operating parameter from the electronic control module;
(b) determine the sequence of at least one measure of driving efficiency based on the plurality of samples of at least one vehicle operating parameter;
(c) display at least one of the determined sequence; and
(d) store the determined sequence in the memory.

26. A driving efficiency gauge as in claim 25 wherein the at least one measure of driving efficiency comprises a measure of normalized cost.

27. A driving efficiency gauge as in claim 25 wherein the at least one measure of driving efficiency comprises a measure of change in vehicle kinetic energy.

28. A driving efficiency gauge as in claim 27 wherein the measure of change in vehicle kinetic energy comprises a measure of braking velocity cost.

29. A driving efficiency gauge as in claim 28 wherein the measure of the braking velocity cost comprises a sampled braking velocity cost proportional to a difference between a square of a current sampled vehicle velocity and a square of a previous sampled vehicle velocity if the vehicle has decelerated between the previous sampled vehicle velocity and the current sampled vehicle velocity and if braking has been applied.

30. A driving efficiency gauge as in claim 29 wherein braking is applied if at least one from a set including asserting a vehicle brake, applying an engine brake, and applying an engine retarder occurs.

31. A driving efficiency gauge as in claim 29 wherein sequence of at least one measure of driving efficiency comprises an instantaneous braking velocity cost per mile based on the ratio of the sampled braking velocity cost to a measure of distance traveled since the previous sampled vehicle velocity.

32. A driving efficiency gauge as in claim 29 wherein the sequence of at least one measure of driving efficiency comprises an average braking velocity cost per mile based on the ratio of the sum of sampled braking velocity costs for a number of samples to an amount of distance traveled during the number of samples.

33. A driving efficiency gauge as in claim 25 wherein driving efficiency comprises a measure of shifting and idling cost.

34. A driving efficiency gauge as in claim 33 wherein the control logic is operative to:
determine a sampled idle cost as a product of sampled engine speed and an engine revolution idle cost; and
determining an instantaneous shifting and idling cost per unit distance as a ratio of the sampled idle cost to a measure of vehicle velocity.

35. A driving efficiency gauge as in claim 34 wherein the control logic is operative to:
determine a sampled idle cost as a product of sampled engine speed and an engine revolution idle cost; and
determine an average shifting and idling cost per unit distance as a ratio of a sum of sampled idle costs for a number of samples to an amount of distance traveled during the number of samples.

36. A vehicle driving efficiency gauge comprising:
a display for displaying at least one measure of driving efficiency;
a memory for holding at least one measure of driving efficiency; and
control logic in communication with the electronic control module, the display, and the memory, the control logic operative to
(a) receive a plurality of samples of vehicle velocity;
(b) determine a measure of change in vehicle kinetic energy based on at least two samples of vehicle velocity;
(c) determine a measure of driving efficiency based on the change in vehicle kinetic energy;
(d) display the measure of driving efficiency; and
(e) store the measure of driving efficiency in the memory.

37. A vehicle driving efficiency gauge as in claim 36 wherein the measure of driving efficiency comprises a measure of normalized cost.

38. A vehicle driving efficiency gauge as in claim 36 wherein the measure of change in vehicle kinetic energy comprises a measure of braking velocity cost.

39. A vehicle driving efficiency gauge as in claim 38 wherein the measure of the braking velocity cost comprises a sampled braking velocity cost proportional to a difference between a square of a current sampled vehicle velocity and a square of a previous sampled vehicle velocity if the vehicle has decelerated between the previous sampled vehicle velocity and the current sampled vehicle velocity and if braking has been applied.

40. A vehicle driving efficiency gauge as in claim 39 wherein braking is applied if at least one from a set including asserting a vehicle brake, applying an engine brake, and applying an engine retarder occurs.

41. A vehicle driving efficiency gauge as in claim 39 wherein the measure of driving efficiency comprises an instantaneous braking velocity cost per mile based on the ratio of the sampled braking velocity cost to a measure of distance traveled since the previous sampled vehicle velocity.

42. A vehicle driving efficiency gauge as in claim 39 wherein the measure of driving efficiency comprises an average braking velocity cost per mile based on the ratio of the sum of sampled braking velocity costs for a number of samples to an amount of distance traveled during the number of samples.

43. A vehicle driving efficiency gauge comprising:
a display for displaying at least one measure of driving efficiency;
a memory for holding at least one measure of driving efficiency; and
control logic in communication with the display and the memory, the control logic operative to
(a) receive a plurality of samples of engine speed;
(b) determine as a measure of driving efficiency a measure of shifting and idling cost based on at least one sample of engine speed;
(c) display the measure of driving efficiency; and
(d) store the measure of driving efficiency in the memory.

44. A vehicle driving efficiency gauge as in claim 43 wherein a measure of shifting and idling cost is determined by the control logic operative to:
determine a sampled idle cost as a product of sampled engine speed and an engine revolution idle cost; and
determining an instantaneous shifting and idling cost per unit distance as a ratio of the sampled idle cost to a measure of vehicle velocity.

45. A vehicle driving efficiency gauge as in claim 43 wherein a measure of shifting and idling cost is determined by the control logic operative to:
determine a sampled idle cost as a product of sampled engine speed and an engine revolution idle cost; and
determine an average shifting and idling cost per unit distance as a ratio of a sum of sampled idle costs for a number of samples to an amount of distance traveled during the number of samples.

* * * * *